T. LUND.
LOCKING MECHANISM.
APPLICATION FILED MAY 27, 1918.
1,426,398.
Patented Aug. 22, 1922.
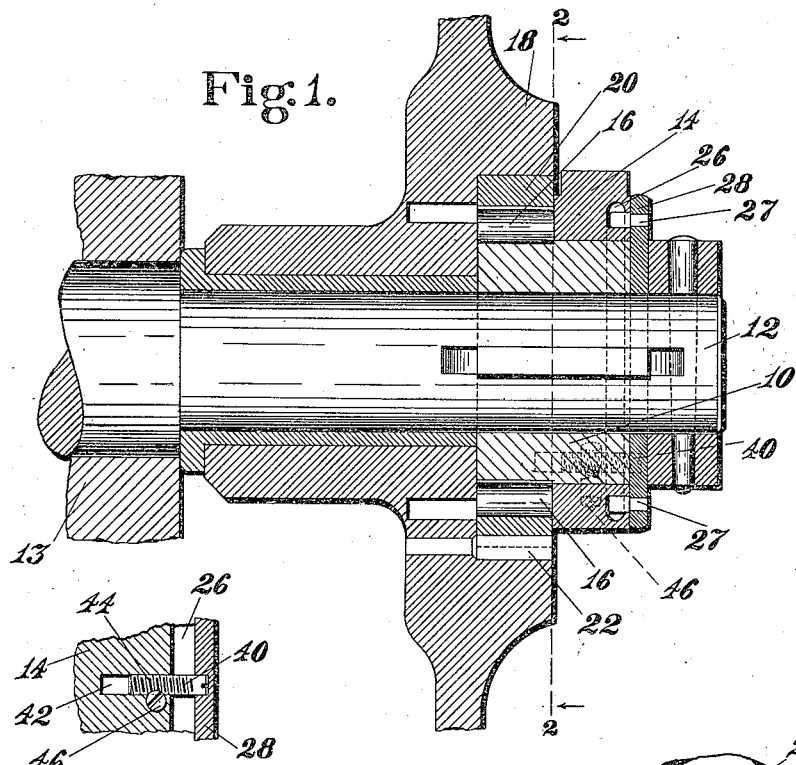
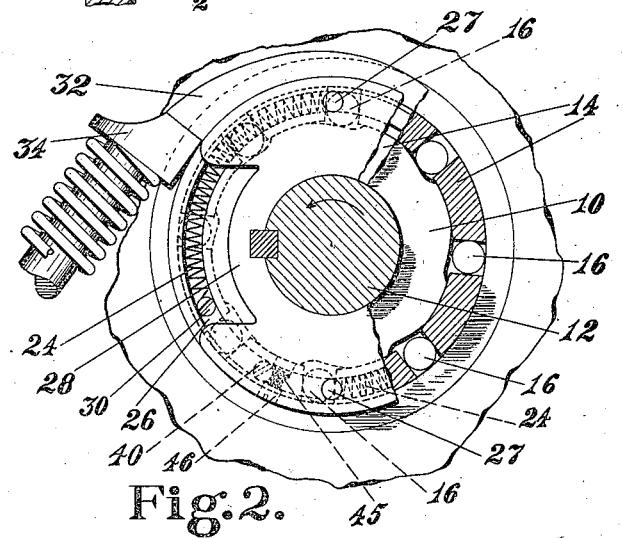
INVENTOR
Thomas Lund

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

LOCKING MECHANISM.

1,426,398.          Specification of Letters Patent.          Patented Aug. 22, 1922.

Application filed May 27, 1918. Serial No. 236,815.

*To all whom it may concern:*

Be it known that I, THOMAS LUND, a citizen of the United States, residing at Beverly, in the county of Essex and State of Massachusetts, have invented certain Improvements in Locking Mechanisms, of which the following description, in connection with the accompanying drawings, is a specification, like reference characters on the drawings indicating like parts in the several figures.

This invention relates to locking mechanisms designed for locking relatively movable parts such as clutch parts.

An object of the invention is to provide a safety locking mechanism which will be adapted, among other uses, to prevent inadvertent engagement of a clutch.

The invention is illustrated herein as embodied in a clutch of the "Horton" type but the invention is not so restricted.

It is often necessary to turn a clutch controlled machine over by hand in order to make adjustments or repairs. In any such case, the machine should be prevented from accidently starting under power while such work is being done, so as to prevent injury to the operator or to the machine. Furthermore, many machines are stopped by brakes which must be released before the machines can be turned over by hand. Such a brake is generally connected with the clutch mechanism and releasing the brake usually also engages the clutch and starts the machine. In such machines, therefore, it is necessary, unless the inconvenient expedient of first removing the driving belt is resorted to, to lock the clutch in disengaged position so that it can not become engaged when the treadle is depressed to release the brake.

A clutch of the "Horton" type may be locked in inoperative position by preventing the roller cage from moving forward under the action of its spring. This possibility was recognized by the inventor of the original "Horton" clutch as set forth in United States Patent No. 260,394, granted July 4, 1882, on application of James A. Horton. In that construction, a loose pin was provided which could be inserted through a hole in the roller cage into a hole in the cam member of the clutch so that movement of the cage relative to the cam member could thus be prevented. Such a construction, however, is undesirable, for example, because of the fact that the pin is liable to be lost and because it is more or less difficult to operate.

Another object of the present invention is to provide a simpler, more convenient and more satisfactory form of locking mechanism which will be permanently located in the clutch, which has no projecting parts, which has no loose parts to be lost, which may be locked or unlocked by a tool which is readily available, such as a screw driver or a standard wrench, and which may have a wide range of usefulness.

A feature of the invention consists in providing a mechanism having a member movable from one position to another and means for operating that member, which means is constructed and arranged to be retained in operative position merely by engagement with said member.

In the illustrated embodiment of the invention, the member that is movable from one position to another is especially designed to lock the roller cage of a clutch of the "Horton" type against operativve movement. In accordance with other features of the invention, the means for operating this locking member is rotatable to effect desired movement of the locking member and the operating means is constructed and arranged to be held against removal as well as against longitudinal movement by interlocking engagement of a reduced portion thereof co-operating with a portion of the locking member. In the illustrated embodiment, the interlocking engagement occurs between cooperating toothed or threaded portions of the operating means and the locking member. These features combine to make a compact and simple construction of parts which are always in position to lock or unlock the roller cage when desired.

Other features of the invention will be readily understood when the following description is considered in connection with the drawings in which:

Fig. 1 is a sectional view taken along the axis of the shaft of a "Horton" clutch mechanism having the present invention incorporated therein;

Fig. 2 is a an end view of the same clutch mechanism, certain portions being shown as a section taken along the line 2—2 of Fig. 1; and Fig. 3 is a detail view of the clutch locking mechanism.

The clutch shown for illustrative purposes in the drawings is of the "Horton" type having a cam member 10 keyed to the shaft 12 of a machine, a portion of the frame of which is shown at 13. Mounted on the cam member is the roller cage 14 carrying a plurality of clutching rollers 16. The roller cage is spring pressed, in the direction of rotation of the shaft, as indicated by the arrow, to force the rollers upon the high parts of their respective cam surfaces of the cam member 10 so as to cause them to connect the cam member with the pulley 18 (only a portion of which is shown), the contact being made against the usual hardened ring 20 inserted into the pulley and secured by the pin 22. The forward spring pressure on the roller cage is produced by two compression springs 24 located in a groove 26 in the roller cage. One end of each spring rests against its respective pin 27 located in a spring plate 28 secured to the shaft 12, while the other end of each spring presses against its respective screw 30, (only one of which is shown) in the groove 26. The roller cage is also provided with the usual projecting lug 32 which disengages the rollers when it strikes the yielding stop dog 34. The above is the usual "Horton" clutch mechanism and is described here only so that the illustrated embodiment of the present invention may be clearly understood.

In the illustrated embodiment of the invention, the locking mechanism is arranged to lock the roller cage 14 to the spring plate 28 so that the cage cannot spring forward and start the machine if the yielding stop dog 34 is disengaged from the lug 32, by the depression of the treadle or otherwise, during the time that adjustments or repairs are being made to the machine.

In the illustrated construction a member 40, which is movable from one position to another, is located in a cylindrical hole 42 in the roller cage 14 of the clutch. When the clutch is disengaged, the member 40 is opposite a hole in the spring plate 28, fixed to the shaft of the machine, and the member 40 may then be projected into the hole in the plate so that the roller cage will be locked relatively to the plate. The member 40 is provided with screw threads 44 and these threads or teeth engage what may be termed a small worm wheel 45 formed upon a reduced portion of a rotatable member 46 located, at right angles to the member 40, in another cylindrical hole in the roller cage 14. While the above described mechanism is essentially a worm and worm wheel, the worm wheel operates as a small driving pinion and the worm operates as a cylindrical rack so that by turning the rotatable member by means of a screw driver inserted in the slot in the outer end of the same, the pinion may be turned to force the member 40 either into locking engagement or to withdraw it so that the clutch will operate in the usual manner. The member 40 is not provided with any means for preventing a turning movement thereof because it is not necessary in the illustrated embodiment of the invention to prevent such turning. It is, therefore, liable to turn slightly when it is moved from one position to another but the turning has no effect upon the operation of the device because the effective movement of the member 40, although it is screw-threaded, is merely a movement of longitudinal translation. However, it is within the scope of the invention, as defined in the claims, to impart any movement to the member 40 that will effect the desired result in connection with the mechanism with which the invention is to be used.

It will be noticed that, as illustrated herein, the member 40 cannot be removed after the mechanism is assembled and that said member, by interlocking with the reduced portion of the rotatable member, acts as a retaining means to prevent longitudinal movement of the rotatable member. Obviously the inner end of the rotatable member, being of larger diameter than the reduced portion of the same, cannot pass by the member 40 and the rotatable member 46 is thus retained longitudinally by the member 40. While it is convenient to have the rotatable member provided with a slotted head, any other form of head for turning it may obviously be provided if a suitable wrench is used with it.

Having thus described the invention, what is claimed as new and desired to be secured by Letters Patent of the United States is:—

1. In a mechanism for transmitting power from one machine element to another, a member for locking the power transmitting mechanism against accidental engagement, and operating means for moving the member to and from locking position, said operating means being retained in operative position by engagement with said member.

2. A mechanism for locking a clutch against accidental engagement, having, in combination, a clutch controlling member, a screw-threaded member translatably movable longitudinally, and operating means for moving said longitudinally movable member into engagement with the clutch controlling member to prevent the clutch from being operated and for retracting said member to allow normal operation of the clutch controlling member, said operating means having a toothed reduced portion to engage the threads of, and be retained against longitudinal displacement by, said longitudinally movable member.

3. A clutch mechanism having, in combination, a driving ring, a driven cam member, rollers for connecting the driving ring and the driven cam member, a roller cage for retaining and controlling the rollers, said roller cage having a limited movement relatively to the cam member to bring the rollers into and out of clutch engaging position, means for controlling the relative position of the roller cage during the normal operation of the clutch, a member in position to lock the roller cage against movement to clutch engaging position at the will of the operator, and operating means for moving the member to and from locking position, said member and said means being constructed and arranged to be held together in operative relation by their interlocking engagement.

4. In a mechanism for transmitting power from one machine element to another, a sliding member for locking the power transmitting mechanism against accidental engagement, and a rotatable member for moving the sliding member to and from locking position, said rotatable member being retained in operative position by engagement with said sliding member.

In testimony whereof I have signed my name to this specification.

THOMAS LUND.